Patented Mar. 21, 1933

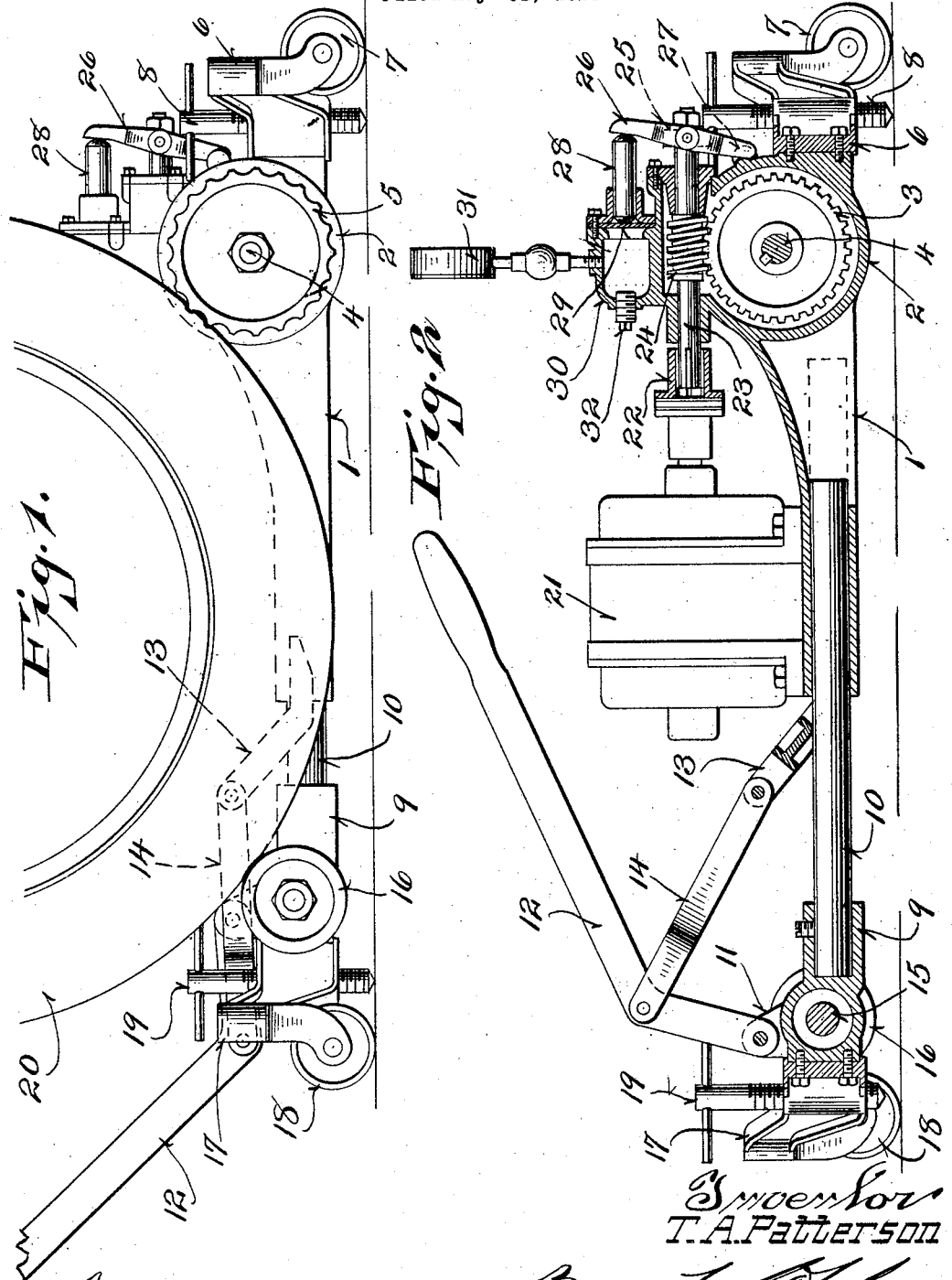

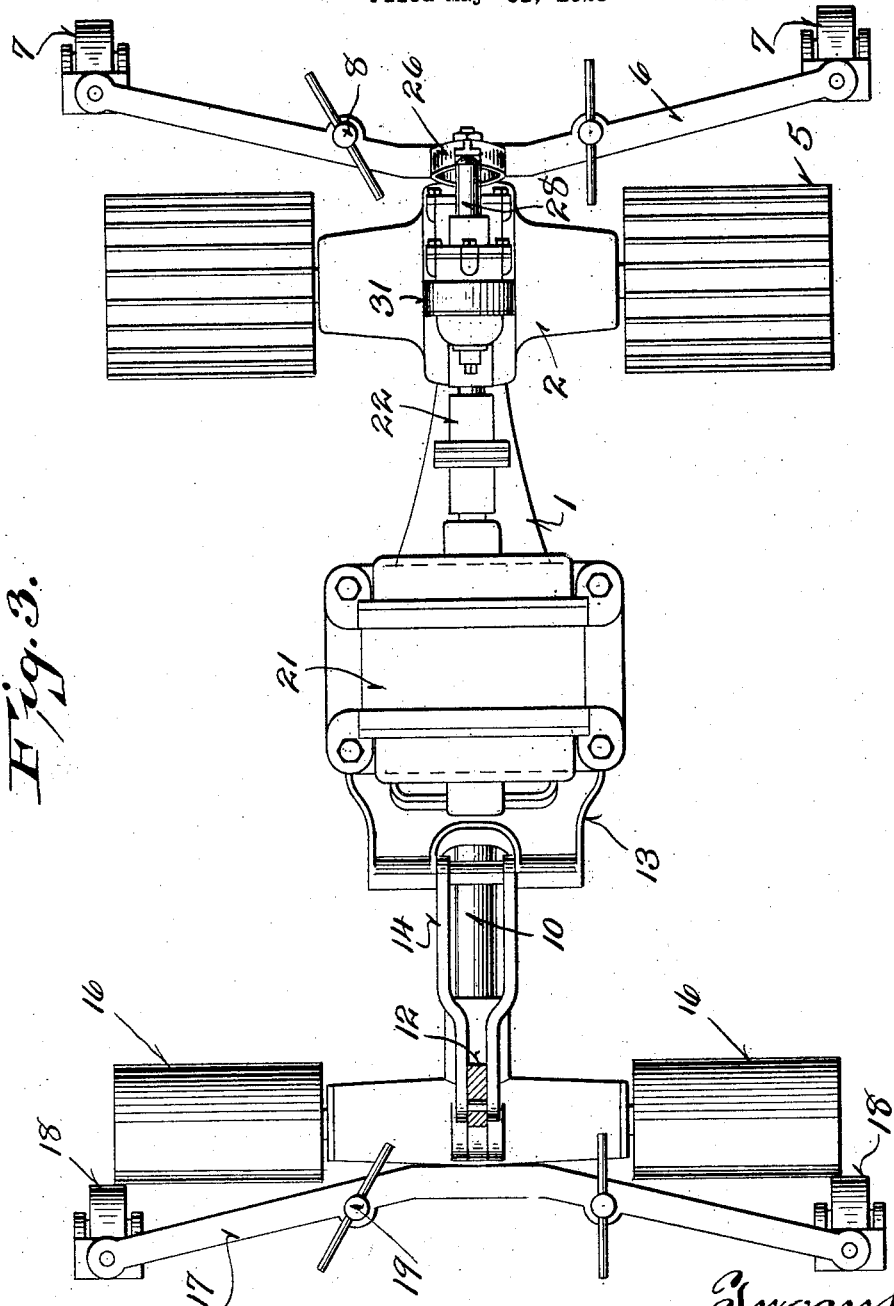

1,902,718

UNITED STATES PATENT OFFICE

THOMAS A. PATTERSON, OF CLINTONVILLE, WISCONSIN

BRAKE TESTING DEVICE FOR VEHICLE WHEELS

Application filed May 31, 1928. Serial No. 282,027.

This invention relates to a brake testing device for vehicle wheels.

Objects of this invention are to provide a novel form of brake testing device which is so constructed that it will indicate the braking force exerted upon the vehicle wheel while the vehicle wheel is in rotation so as to give an accurate indication of the exact conditions existing during operation of the vehicle.

Further objects are to provide a novel form of vehicle brake testing device which is so constructed that a pair of wheel supporting rollers are carried in a position to be placed on opposite sides of a vehicle wheel and thereafter drawn towards each other to elevate and support the wheel, and to provide power driven means for rotating the wheel against the action of the brake and to associate a dynamometer with the driving means, so that it indicates a continuous braking force, irrespective of the rotation of the wheel and dependent solely upon the actual braking effort exerted by the wheel.

Further objects are to provide a device having the characteristics enumerated above which is freely portable and may be readily rolled into place adjacent the vehicle wheel, and which may be subsequently locked to the ground to prevent shifting during the testing operation.

An embodiment of the invention is shown in the accompanying drawings in which:

Figure 1 is a side elevation of the device showing it in position with the wheel elevated;

Figure 2 is a sectional view through the device showing the parts extended;

Figure 3 is a plan view of the device with the handle of the link mechanism sectioned off.

Referring to the drawings, it will be seen that the device comprises a body portion 1 provided with a casing 2 within which a worm wheel 3 is positioned and carried by a transverse shaft 4. The shaft 4 projects from opposite sides of the casing 2 and carries fluted rollers 5 at opposite ends. These rollers are the driving rollers for the wheel, as will appear hereinafter.

The body portion 1 is also provided with a pair of outwardly projecting arms 6 which carry caster wheels 7. Further, these arms are provided with locking screws 8 adapted to engage the ground, as shown in Figure 1, when the device is in place, and thus to lock the device against shifting relatively to the ground.

The device is also provided with an auxiliary portion 9 which is adjustably locked to a rod 10. The rod 10 is slidably received within the body portion 1, as shown most clearly in Figure 2. This auxiliary portion is provided with upwardly extending ears 11 to which the rocking lever or handle 12 is pivoted.

Further, the body portion is provided with upwardly extending arms 13 to which one end of a pair of links 14 are pivoted. The other end of this pair of links 14 is pivoted intermediate the ends of the rocking lever or operating handle 12. Thus, when the handle is rocked into the position shown in Figure 2, the auxiliary part and the body portion are moved apart. When the handle is rocked into the position shown in Figure 1, the body portion and auxiliary portion are caused to approach each other.

The auxiliary portion 9 is provided with a transverse shaft 15 which carries a pair of idler rollers 16 at its ends. Further, this auxiliary portion is provided with a pair of outwardly extending arms 17 similar to the arms 6, such arms being equipped with caster wheels 18 adjacent their ends. The arms 17 also carry the locking screws 19 which when the device is finally positioned, are forced into contact with the ground.

In applying the device to an automobile wheel all that is necessary is to roll the apparatus into place, as shown in Figure 1, with the wheel 20 of the automobile positioned between one of the rollers 5 and the corresponding roller 16. Thereafter, the handle 12 is rocked into the position shown in Figure 1, thus causing the roller 16 to approach the roller 5 and to thus lift the automobile wheel up clear of the ground and thereafter carry it upon the rollers 5 and 16. It is to be noted from Figure 1 that when the handle 12 is rocked into the position there shown, that the links 14 move past dead center and thus lock the parts against separation.

The body portion carries an electric motor 21 whose shaft is provided with a fitting 22 (see Figure 2) to which a longitudinally extending worm shaft 23 is loosely splined, so that the worm shaft may freely shift back and forth, as will be hereinafter pointed out. This worm shaft 23 is provided with a worm 24 which meshes with the worm wheel 3 and thus drives the worm wheel and the rollers 5 when the electric motor is operated. The end of the worm shaft is received by a thrust bearing 25 pivotally carried within the looped or bowed portion of a rocking lever 26. The lower end of the lever 26 bears against a projecting lug formed on the casing 2 and is guided between a pair of ears 27. The upper end of the lever 26 bears against a plunger 28. The inner end of this plunger bears against a flexible diaphragm 29 which closes the mouth of a small casing 30 within which oil or other liquid is carried. A pressure gauge 31 is connected directly to the small casing 30. If desired, a removable plug 32 may be screwed into the casing 30 so that it may be filled, emptied, or cleaned.

The pressure gauge 31 is graduated in any suitable manner. However, it is preferable to graduate this gauge so that it will indicate the braking force exerted by the wheel driven from one of the driving rollers 5.

In using the device, the lever 12 is positioned, as shown in Figure 2, and the device is rolled into place with the automobile wheel 20 positioned between the rollers 5 and 16. Thereafter, the handle 12 is rocked into the position shown in Figure 1, thus elevating the automobile wheel and carrying such wheel upon a driving roller and an idler roller. Thereafter, the motor is operated to drive the worm shaft. This worm shaft tends to move longitudinally of the device and thus through the medium of the lever 26 transmits its effort to the plunger 28. The plunger 28 forces the diaphragm 29 inwardly and thus puts the liquid under pressure, such pressure being indicated by the gauge 31. The braking effect due to different settings of the brake, may be accurately measured and thus the several wheels may have their appropriate braking effort apportioned between them.

Further than this, for any given setting of the brake of the vehicle, the gauge 31 indicates a constant pressure, if there are no irregularities in the brake drum. However, if there are irregularities in the brake drum, as for example, when the brake drum has high spots or is elliptical instead of round, the pressure will increase and fall off regularly as the wheel rotates and thus this defect, or any similar defect, is readily shown up. However, if the brake drum is round and the other conditions are correct, the pressure indicated will be constant for any given setting of the brake. In addition to this, this pressure indicates the actual pressure exerted by the brake while the wheel is in rotation and corresponds exactly to the braking effort of the vehicle under road conditions.

Further than this, it is to be noted that the device is extremely simple, is readily produced by ordinary machine shop methods, is substantially fool-proof, and is freely portable and requires no auxiliary apparatus whatsoever.

Although the invention has been described in considerable detail, such description is intended as illustrative rather than limiting as the invention may be variously embodied and as the scope of such invention is to be determined as claimed.

I claim:

1. A brake testing device for vehicle wheels comprising a body portion, an auxiliary portion slidably carried by said body portion, wheel engaging rollers carried by said body portion and auxiliary portion, means for moving said auxiliary portion towards said body portion to cause said rollers to engage and raise a wheel of the vehicle, power means for rotating one of said rollers, and a dynamometer for indicating the force required to rotate the vehicle wheel.

2. A brake testing device for vehicle wheels comprising a body portion and an auxiliary portion movable relative to the body portion, revoluble drums carried by each of said portions and adapted to support a vehicle wheel, means for causing the drums to approach each other to support a wheel of the vehicle, power means for driving one of said drums and force measuring means including an indicating device and cooperating with said power means for determining the force required to drive the wheel.

3. A brake testing device for vehicle wheels comprising a body portion, and an auxiliary portion, a rod secured to one of said portions, means carried by the other portion for slidably receiving said rod, link mechanism for adjusting the relative position of said body portion and auxiliary portion, and for locking said portions in adjusted position, wheel supporting rollers carried by each of said portions, power means for driving one of said rollers, and force measuring means including an indicating device cooperating with said power means for determining the force required to drive a vehicle wheel.

4. A brake testing device for vehicle wheels comprising a body portion and an auxiliary portion, a rod secured to one of said portions, means carried by the other portion for slidably receiving said rod, link mechanism for adjusting the relative position of said body portion and auxiliary portion and for locking said portions in adjusted position, wheel supporting rollers carried by each of said portions, power means for driving one of said rollers, an indicating device cooperating with the power means for indicating the force required to drive the wheel, means including wheels for supporting said body and auxiliary portions, and means for locking said body and auxiliary portions to the surface beneath them.

In testimony that I claim the foregoing I have hereunto set my hand at Clintonville, in the county of Waupaca and State of Wisconsin.

THOMAS A. PATTERSON.